United States Patent

Fahey

[15] 3,676,421

[45] July 11, 1972

[54] ORTHO-CHLORINATION OF AZOBENZENE

[72] Inventor: Darryl R. Fahey, Bartlesville, Okla.

[73] Assignee: Phillips Petroleum Company

[22] Filed: Nov. 26, 1969

[21] Appl. No.: 880,376

[52] U.S. Cl. .................................260/205, 260/578, 260/694
[51] Int. Cl. ........................................................C07c 107/06
[58] Field of Search ...........................................260/205, 694

[56] References Cited

UNITED STATES PATENTS 2,823,202   2/1958   Thelin.....................................260/205
3,156,724   11/1964  Werner et al..........................260/569

*Primary Examiner*—Lewis Gotts
*Assistant Examiner*—C. F. Warren
*Attorney*—Young and Quigg

[57] ABSTRACT

A method of chlorinating azobenzene in the ortho positions by employing a palladium chloride catalyst in the presence of water and an organic compound in which azobenzene is soluble.

10 Claims, No Drawings

3,676,421

ORTHO-CHLORINATION OF AZOBENZENE

This invention relates to the chlorination of azobenzene.

In one of its more specific aspects, this invention relates to ortho-chlorination of azobenzene in the presence of a palladium catalyst.

The ortho-chlorinated benzene products of this invention are useful in the preparation of diamines for manufacturing polymers. For example, ortho-chlorinated compounds such as 2,2'-dichloroazobenzene can, by means of the benzidine rearrangement, be converted to 3,3'-dichloro-4,4'-diaminobiphenyl useful as a starting material for the production of complex polymers. The method of this invention provides a process for producing such chlorinated benzenes.

According to the method of this invention there is provided a process of producing ortho-chlorinated azobenzene which comprises reacting azobenzene with chlorine in the presence of catalytic quantities of palladium chloride in an aqueous solution of an organic solvent.

Accordingly, it is an object of this invention to provide a simple and convenient method for the production of ortho-chlorinated azobenzene compounds.

The method of this invention contemplates the chlorination of azobenzene in a reaction medium comprising water and an acyclic or cyclic ether miscible with water at least to the extent of about 1 to about 10 parts by weight per part by weight of water. The acyclic or cyclic ether acts as a solvent for the azobenzene and while dioxane is preferred, other suitable solvents such as tetrahydrofuran, 1,2-dimethoxyethane, bis(2-methoxyethyl)ether and other nonreactive, water-miscible organic substances, or their mixtures can be employed.

The reaction mixture will be comprised of from about 25 to about 200 parts by weight of the ether-water mixture per part by weight of azobenzene.

The amount of the palladium chloride used will be from about 2 to about 50, preferably from about 15 to about 20, mols per 100 mols of azobenzene. The reaction period can be in the range of about 0.25 to about 40 hours.

The reaction mixture which comprises the palladium chloride, the azobenzene, water and the organic solvent is established by bringing these materials together in any suitable manner in any desired order. Chlorine is introduced into the reaction mixture by dispersing it as a gas through the mixture, at a rate sufficient to maintain the progress of the reaction as indicated by maintaining the color of the reaction mixture between orange and maroon. The reaction is conducted at a temperature from about 25 to about 100° C. and at a reaction pressure which can vary from 1 to 100 atmospheres.

It is desirable to maintain the pressure sufficiently high to maintain the mixture of solvent, azobenzene derivative and catalyst substantially completely in the liquid phase.

The ortho-chlorinated azobenzene product can be recovered by any suitable extraction method from the reaction mixture, extraction being made with ether or other suitable solvent and recovery being made therefrom.

The method of the invention is illustrated by the following example.

EXAMPLE I

A dioxane-water mixture of 75 ml., comprised of 50 ml. of dioxane and 25 ml. of water, had introduced into it 5.5 mmols of azobenzene and 1.0 mmol of palladium chloride. The mixture was agitated at 85° C. and chlorine was introduced at a rate sufficient to impart to the reaction mixture a color between orange and maroon. After 16 hours of chlorine introduction, the mixture was cooled and extracted with 50 ml. of ether. The ether was distilled from the extract under vacuum to leave a maroon oil which was chromatographically analyzed and found to contain 12 percent 2-chloroazobenzene, 22 percent 2,6-dichloro-azobenzene, 30 percent 2,2'-dichloroazobenzene and 33 percent 2,6,2'-trichloro-azobenzene and 3 percent 2,2',6,6'-tetrachloroazobenzene. These data indicate the operability of the method of this invention in chlorinating azobenzene in the ortho position.

EXAMPLE II

In a procedure carried out in a manner similar to that of Example I, the residual oil was subjected to column chromatography on acid washed alumina. The azobenzene products, eluted with 10 percent ether in pentane, were obtained as an orange solid. After several recrystallizations from ethanol, the product was found to have a melting point of 126°–128° C. and to contain 57.2 percent carbon and 3.2 percent hydrogen and to possess infrared and nuclear magnetic resonance spectra identical to those of an authentic sample of 2,2'-dichloroazobenzene.

The above example indicates that the method of this invention chlorinates azobenzene in the ortho position.

EXAMPLE III

That procedure carried out in Example I was repeated except that no palladium chloride was employed. From the ether extract, a residual orange solid was obtained and by chromatographic analyses was found to have an analysis of approximately 16 percent azobenzene, 71 percent 4-chloroazobenzene and 13 percent 4,4'-dichloroazobenzene.

These examples establish that the presence of palladium chloride is essential to the method of this invention and that the palladium chloride, when present, catalyzes the ortho-chlorination of the azobenzene to the exclusion of all other modes of chlorination.

Example III demonstrates that when chlorination is carried out in the absence of palladium chloride the 4-chloro, or para, derivative is obtained.

It will be evident from the foregoing that various modifications can be made to the method of this invention. Such, however, are considered as being within the scope of the invention.

What is claimed is:

1. A method of producing ortho-chlorinated azobenzene which comprises contacting azobenzene with gaseous chlorine in the presence of palladium chloride as the catalyst in a reaction medium consisting essentially of water and at least one of a nonreactive acyclic and cyclic ether, said ether being miscible with said water in an amount not less than one part by weight per part by weight of said water to chlorinate said azobenzene in the ortho position and recovering the ortho-chlorinated azobenzene.

2. The method as defined in claim 10 in which said aqueous solution of said ether is comprised of from about 1 to about 10 parts by weight of said ether per part by weight of water.

3. The method as defined in claim 10 in which palladium chloride is present in an amount from about 2 to about 50 mols per 100 mols of azobenzene.

4. The method as defined in claim 10 in which said aqueous solution of ether is present in an amount from about 25 to about 200 parts by weight per part by weight of azobenzene.

5. The method as defined in claim 10 in which said gaseous chlorine is introduced into contact with said azobenzene at a rate sufficient to maintain the progress of the reaction and for a period of from about 0.25 to about 40 hours.

6. The method as defined in claim 10 in which said ether is one of dioxane, tetrahydrofuran, 1,2-dimethoxyethane, bis(2-methoxyethyl)ether.

7. The method as defined in claim 10 in which said ether is dioxane.

8. The method as defined in claim 7 in which said contacting is made at a temperature of from about 25° C. to about 100° C. and at a pressure at which the reaction mixture is maintained substantially in the liquid phase.

9. The method as defined in claim 10 in which azobenzene is contacted with gaseous chlorine in the presence of a dioxane-water mixture comprising about 2 parts of dioxane by weight and about 1 part of water by weight at a temperature of 85° C. for a period of about 16 hours and at a rate sufficient to impart to the reaction mixture an orange color.

10. The method of claim 1 in which said palladium chloride is present in an amount within the range of from about 15 to about 20 mols per 100 mols of azobenzene.

* * * * *

CERTIFICATE OF CORRECTION

Patent No. 3,676,421                                          Dated: July 11, 1972

Darryl R. Fahey

It is certified that error appears in the above-identified patent and that said Letters Patent are hereby corrected as shown below:

Column 2, lines 45, 48, 51, 54, 58, 61 and 67, delete "10" each instance and insert --- 1 ---.

Signed and sealed this 2nd day of January 1973.

(SEAL)
Attest:

EDWARD M. FLETCHER, JR.                        ROBERT GOTTSCHALK
Attesting Officer                                   Commissioner of Patents